March 20, 1973 J. H. WHARTON 3,721,931

ELECTROMAGNETIC FOCUSING AND DEFLECTION ASSEMBLY FOR CATHODE RAY TUBES

Filed July 6, 1971 2 Sheets-Sheet 1

INVENTOR.

J. Hugh Wharton

BY

ATTORNEY

March 20, 1973 J. H. WHARTON 3,721,931

ELECTROMAGNETIC FOCUSING AND DEFLECTION ASSEMBLY FOR CATHODE RAY TUBES

Filed July 6, 1971 2 Sheets-Sheet 2

INVENTOR.
J. Hugh Wharton
BY
Paul J. Rasmussen
ATTORNEY 3,721,931

ELECTROMAGNETIC FOCUSING AND DEFLECTION ASSEMBLY FOR CATHODE RAY TUBES

James Hugh Wharton, Indianapolis, Ind., assignor to RCA Corporation

Filed July 6, 1971, Ser. No. 159,810
Int. Cl. H01f 5/00
U.S. Cl. 335—213 11 Claims

ABSTRACT OF THE DISCLOSURE

A deflection coil assembly for an image conversion tube such as a vidicon has the active field producing conductors flared away from the central longitudinal axis of the vidicon at the end adapted to be closest to the target electrode. A focusing coil assembly which may be disposed coaxially inside of the deflection coil assembly provides a nonuniform magnetic field which in conjunction with the deflection field enables operation of the tube with minimum aberrations such as astigmatism and minimum beam landing error.

BACKGROUND OF THE INVENTION

This invention relates to electromagnetic forcusing and deflection assemblies utilized with image conversion tubes.

To derive electrical signals representative of an image stored in the image portion of image conversion tubes such as the image orthicon and the vidicon it is customary to cause an electron beam to scan an electrode containing an electrical charge representative of the image. In most situations, such as in television cameras, the beam is caused to scan a raster at predetermined line and field scanning rates. The electrical signals will be representative of the image only if the scanning electron beam can be controlled such that it is focused uniformly over the scanned area, has minimum beam landing error, i.e., lands perpendicular to the scanned surface and has minimum spot distortion and other aberrations.

These characteristics of the electron beam are controlled by the interaction of the magnetic and electric fields produced by the focusing coil assembly, the deflection coil assembly and the electrodes within the tube. Some currently produced vidicons utilize a wall electrode and a mesh electrode separated from the photoconductive target assembly which may be energized for producing electric fields which compensate for the undesirable characteristics imparted to the beam by the electromagnetic focusing and deflection components. For example, the wall electrode may be dynamically energized by parabolic waveforms at the line and field scanning rates to straighten out the normally spherical shaped electron focus plane. However, additional circuitry is required for producing and applying dynamic correction waveforms and this adds to the complexity and cost of a camera utilizing this arrangement.

The requirements of a flat beam focal plane and beam characteristic uniformity over the entire scanned raster is essential in those applications in which a striped spatial color encoding filter assembly is utilized with an image conversion tube such as a vidicon for spatially encoding a plurality of colors on one target electrode. The beam must remain uniform to properly resolve the various encoded solor stripe patterns such that the correct hue and saturation of the scene is contained in the derived color representative signals.

According to the invention an electromagnetic focusing and deflection assembly is provided for use with an image conversion tube. A focusing coil assembly is selected for providing a nonuniform focusing field in the portion of the tube between the electron gun assembly and the scanned target electrode. A deflection assembly is disposed coaxially with the focusing coil assembly and has its deflection field producing conductors flared outwardly from the central longitudinal axis of the focusing and deflection assembly. In a preferred embodiment the focusing coil assembly is disposed inside of the deflection coil assembly.

In one embodiment the deflection coil assembly comprises a pair each of saddle-shaped vertical and horizontal deflection coils, the active longitudinal conductors of which are flared outwardly from the central longitudinal axis as described above. In another embodiment the deflection coil assembly comprises a toroidal coil assembly in which the ferrite core and the toroidally wound conductors thereon are flared outwardly as described above.

A more detailed descriptions of a preferred embodiment of the invention is given in the specification and accompanying drawings of which:

DESCRIPTION OF PREFERRED EMBODIMENTS OF THE INVENTION

Figure 1:
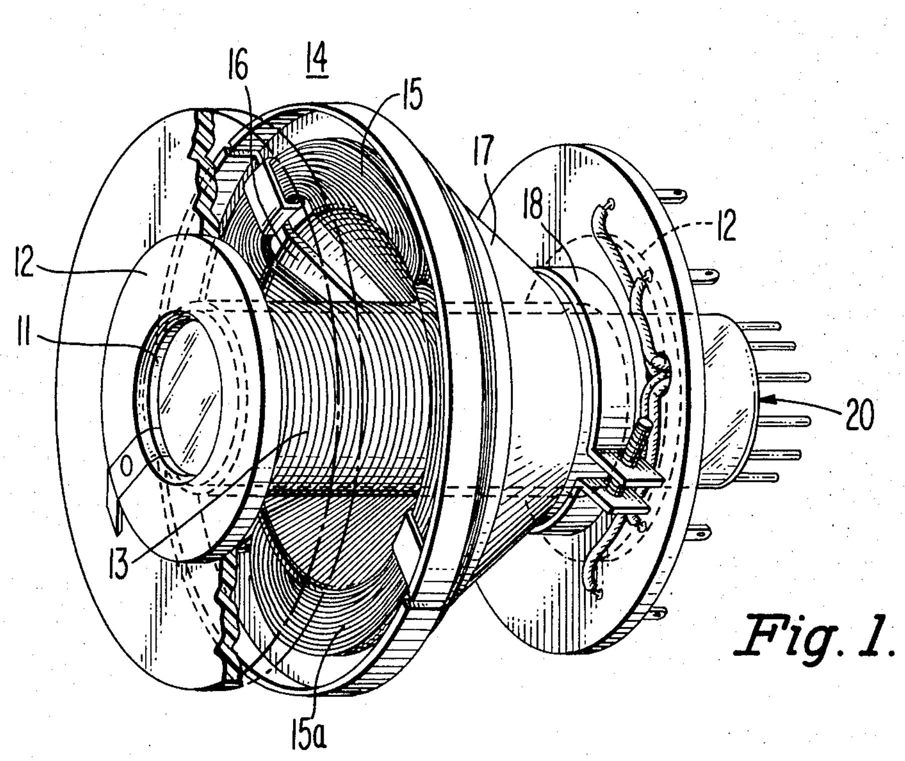
FIG. 1 is an assembly view of a focusing and deflection assembly according to the invention.

FIG. 1 is an assembly view of a focusing and deflection assembly according to the invention. An image conversion tube 20 such as a vidicon is disposed inside a phenolic cylindrical form 11. Cylinder 11 has front and rear members 12 extending outwardly from the cylinder at the front and rear portions thereof. Wound around cylinder 11 in a generally solenoid manner is a focusing coil 13. The windings of coil 13 extend generally from the portion of cylinder 11 adjacent a target electrode of vidicon 20 rearwards to a portion in the region of the electron gun assembly of the vidicon. Focusing coil 13 may have a varied turns distribution along the longitudinal axis of cylinder 11 or it may be segmented as will be described subsequently.

Disposed between form members 12 around and outside of focusing coil 13 is an electromagnetic beam deflection assembly 14. Deflection assembly 14 comprises a pair of saddle-shaped horizontal deflection coils 15 and 15*a* and a pair of saddle-shaped vertical deflection coils, only one of which, 16, is shown disposed outside of coils 15 and 15*a*. The two pairs of deflection coils are surrounded by a ferrite core 17. The deflection coils and the ferrite core are held together by means including a metal band 18 surrounding the assembly. Unlike conventional deflection assemblies normally utilized with vidicons in which the coils lie generally parallel with the center longitudinal axis of the vidicon, the coils in deflection assembly 14 are flared outwardly from the central axis in a manner similar to deflection coils utilized with television kinescopes in which the front portion of the coils (shown at the left side of the drawing in FIG. 1) follow the flared portion of the kinescope glass envelope.

Figure 2:
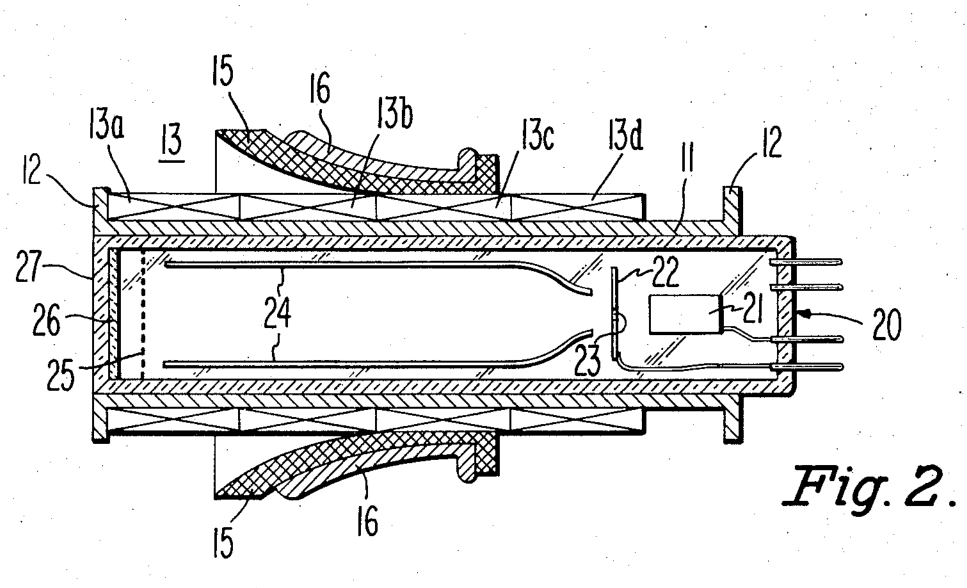
FIG. 2 is a partial sectional view of a focusing and deflection assembly according to the invention.

FIG. 2 is a partial sectional view of a focusing and deflection assembly according to the invention. Elements of the assembly shown in FIG. 2 being similar and performing the same function as the elements shown in FIG. 1 are designated by the same reference numerals as in FIG. 1. In FIG. 2 a vidicon 20 is shown disposed inside of the cylindrical form 11. The vidicon 20 may be a type 8507 as manufactured by the RCA Corporation and as described in a bulletin entitled "New Product Announcement, RCA–8507 Vidicon" dated Nov. 5, 1963 and published by RCA Corporation, Lancaster, Pa. This type vidicon includes an electron gun assembly 21 and a beam aperture plate 22 having a relatively narrow aperture 23 therein for limiting the angle at which beam electrons pass through the aperture. Disposed inside of the cylindrical glass envelope of the vidicon is a wall electrode 24 which when energized by a suitable potential serves to aid in focusing the beam electrons. The vidicon includes a separate collector mesh electrode 25 which when suitably energized helps to control the beam landing characteristics. Disposed inside of a faceplate 27 at the end of the vidicon away from the electron gun assembly is a photoconductive target assembly 26 which is scanned by the electron beam and from which signals representative of an image focused thereon are derived as the beam is scanned across the target.

Circumferentially disposed around phenolic form 11 are four focusing coil segments 13*a*–13*d*. These focusing coil segments are adapted to be energized separately by different amounts of current for producing a nonuniform axial focusing field to be described subsequently.

Disposed on the outside of focusing coil 13 is a pair of saddle-shaped vertical deflection coils 16 and 16*a* and a pair of saddle-shaped horizontal deflection coils, only one of which, 15, is seen in the drawing. The coils are adapted to be energized by suitable scanning currents at the line and field scanning rate. As can be seen in FIG. 2 the front portion of the deflection coils nearest the target electrode end of vidicon 20 are flared outwardly from the central axis of the vidicon. As mentioned previously, these coils are similar in appearance to saddle-type deflection coils disposed adjacent the flared bulb portion of a television kinescope. A major advantage of utilizing flared deflection coils with an image conversion tube is that since the flared portion of the coils produces a field across a larger area than the cross-sectional area within the tube over which the beam is deflected the deflection field in the area over which the beam is deflected is much more uniform than that produced by the conventional type deflection coils utilized with image conversion tubes and which are disposed to encircle the tube closely at all points along their length. Thus, the flared deflection coils provide a magnetic deflection field which is relatively free of fringe effects and which results in imparting less aberration to the electron beam as it is scanned across the target electrode 25.

Figure 3:
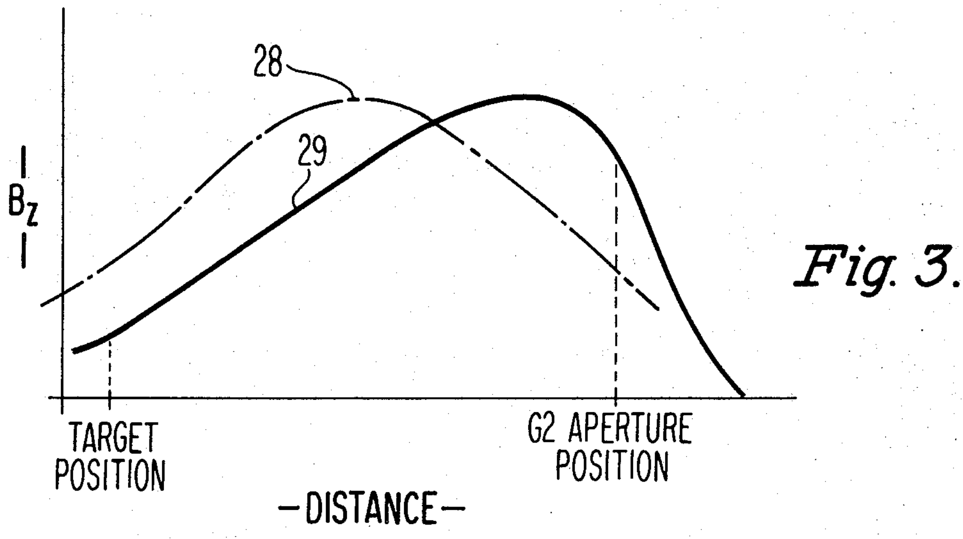
FIG. 3 is a graph representative of the focusing field produced by the assembly shown in FIG. 2.

FIG. 3 is a graph of the focusing field produced along the length of the assembly shown in FIG. 2. The curve 28 is a plot of a typical focusing field utilized with image pickup devices of the vidicon type. Inspection of a curve 28 shows it to be representative of a uniform field, which uniform field was used advantageously with prior art focusing and deflection assemblies. Curve 29 is a plot of a nonuniform magnetic focusing field produced by the focusing assembly illustrated in FIGS. 1 and 2. The field is nonuniform and has a higher flux density in the region of the electron gun assembly than in the target electrode region of the vidicon. This condition produces a magnification of the electron beam at the target relative to the cross-sectional area of the beam as it leaves the aperture 23 of aperture plate 22 shown in FIG. 2. The nonuniform field may be produced by the focusing coil assembly 13 of FIG. 2 by separately energizing the similar coil segments 13*a*–13*d* with different amounts of current, the largest current being applied to the most rearward focusing coil segment 13*d*. As mentioned above, the focusing coil need not be segmented but may be a single coil having a varied turns distribution such that the greatest flux density is produced along the tube axis at the rear portion of the coils.

Utilizing a nonuniform focusing field in combination with a uniform deflection field produced by the deflection coil assembly 14 results in the beam landing normal to the target electrode when it leaves the transverse deflection field. This beam action is best achieved by adjusting the potentials applied to the electrostatic elements 24 and 25 of the vidicon 20 to be optimized for the amount of current applied to the focusing coil assembly. The nonuniform axial focusing field produced by the focusing coil assembly 13 also provides a greater depth of focus in the region of the target electrode 26. Thus, the entire assembly is less susceptible to an out-of-focus condition caused by changes in focus current or voltage.

Figure 4:
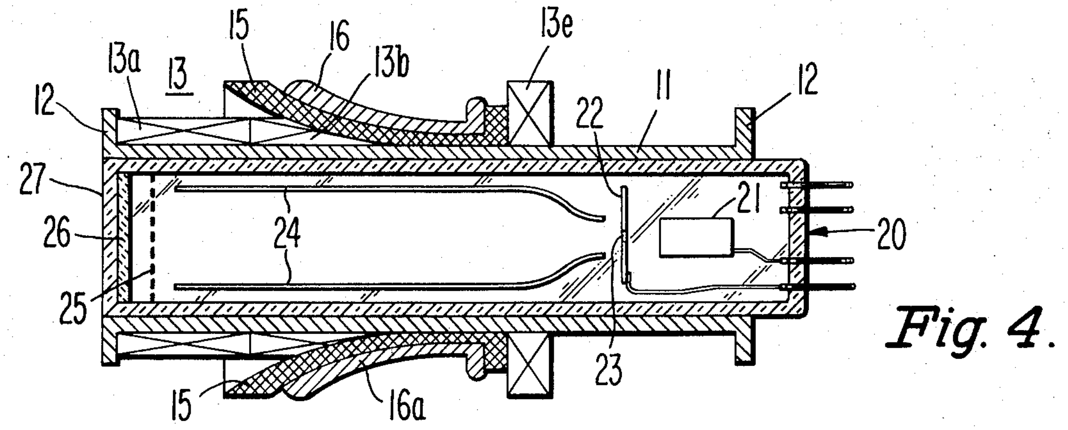
FIG. 4 is a partial sectional view of an alternative focusing and deflection assembly according to the invention.

FIG. 4 is a partial sectional view of an alternative focusing and deflection assembly according to the invention. Those elements in FIG. 4 which are similar to the corresponding elements in the previous figures are numbered the same. It can be seen in FIG. 4 that the focusing coil assembly arrangement differs somewhat from the arrangement shown in FIG. 2. Focusing coil segments 13*a* and 13*b* are disposed in the assembly towards the target electrode end of the vidicon 20. The horizontal and vertical deflection coils 15 and 16 have their straight portion to the rear of the flared portion directly adjacent phenolic form 11. To the rear of the deflection coil assembly is another focusing coil segment 13*e*. Focusing coil segment 13*e* is wound somewhat narrower in length and is wound somewhat thicker than focusing coil segments 13*a* and 13*b*. With this arrangement segment 13*e* can provide the desired magnetic focusing field at the rear portion of the vidicon 20 without imparting undue heat to the vidicon. With this arrangement the operation of the vidicon and the television camera in which it is utilized becomes more stable because of the lesser amount of heat generated during operation. It has been determined that a nonuniform magnetic focusing field similar to that illustrated by the curve 29 of FIG. 3 may also be generated by the focusing coil arrangement shown in FIG. 4 by controlling the current in each of the coil segments.

By eliminating the focusing coil portion underneath the straight portion of deflection coils 15 and 16 it is possible to locate the deflection coils closer around the glass envelope of vidicon 20. Thus, the deflection coils may be made smaller, conserving the copper conductors used in its windings and also conserving electric power because less current is needed for producing the required magnetic deflection field. A major advantage of the structure described above, i.e., the more uniform field produced by flared deflection coils, is preserved in this embodiment because the flared portion of the deflection coils still covers a cross-sectional area substantially larger than the cross-sectional area within the vidicon over which the beam is to be deflected. It should be noted that the arrangement in which the most rearward focusing coil segment 13*e* is made shorter and thicker may also be utilized with the entire deflection coil assembly disposed around the focusing coil assembly 13. Further, the deflection coils may be disposed adjacent the form 11 as shown in FIG. 4 without having the focusing coil portion 13*e* shorter and thicker than the remaining portions of focusing coil 13.

Figure 5:
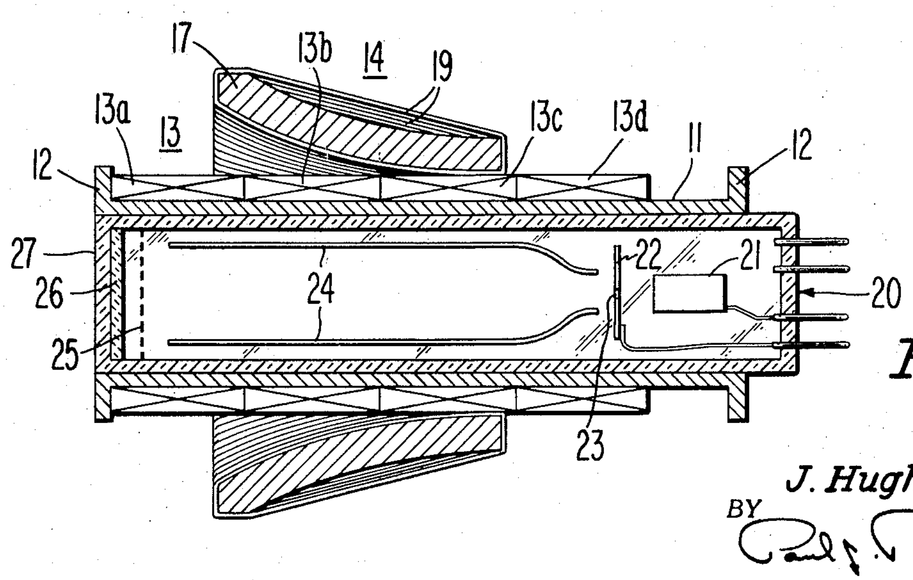
FIG. 5 is a partial sectional view of an alternative embodiment of the invention utilizing a toroidal deflection assembly.

FIG. 5 is a partial sectional view of an alternative embodiment of the invention utilizing a toroidal deflection assembly. It is known in the art that a toroidal deflection yoke may be constructed such that it may produce vertical and horizontal magnetic deflection fields similar to those produced by a particular yoke utilizing saddle-type vertical and horizontal deflection coils. Thus, the invention may utilize a toroidal deflection yoke and attain advantages similar to those attained by the use of a saddle coil type deflection yoke as described in conjunction with FIGS. 1, 2 and 4. In FIG. 5 a deflection coil assembly 14 comprises a toroidal ferrite core 17 around which are toroidally wound conductors 19 having suitable taps pulled therefrom for forming vertical and horizontal deflection coil portions. This toroidal deflection coil assembly is disposed circumferentially around the focusing coil assembly 13. The view in FIG. 5 shows that the toroidal deflection coil assembly is flared outwardly from the focusing coil and vidicon assembly at the end closest to the target electrode 26. The individual vertical and horizontal coil portions of the toroidal deflection assembly are adapted to be energized by scanning currents at the vertical and horizontal scanning rates such that the electromagnetic deflection fields produced upon energization are similar to those described in conjunction with the apparatus of FIGS. 1, 2 and 4. Thus, a uniform deflection field is produced generally transversely of that area within the vidicon over which the electron beam is to be deflected. The focusing coil assembly 13 is selected to be similar to that described in conjunction with FIG. 2 for producing the nonuniform axial focusing field illustrated by the curve 29 in FIG. 3. The combination of structures comprising the toroidal deflection assembly and the nonuniform focusing field producing structure 13 results in a deflection and focusing assembly which enables operation of the vidicon with minimum aberrations such as astigmatism and minimum beam landing error as described above.

The focusing coil assembly 13 in FIG. 5 may also be modified in accordance with the teaching disclosed in conjunction with FIG. 4, for example, the focusing coil portions 13*b* and 13*c* may be eliminated or modified such that the toroidal core 17 may be selected smaller in order to fit snugly around the phenolic cylinder 11. This would result in a smaller toroidal deflection yoke assembly and a corresponding reduction in the amount and cost of materials utilized in the deflection assembly. Also, the most rearward focusing coil portion 13*d* may be modified to be similar to the focusing coil portion 13*e* of FIG. 4 so that this focusing coil portion generates a magnetic field component with the desired characteristics with minimum heat transfer to the vidicon. As described in conjunction with FIG. 4 these two modifications to the focusing coil assembly may be utilized singly or in combination as desired. In general, a toroidal deflection assembly has the advantage over a corresponding saddle-type deflection yoke of requiring less copper wire for producing a deflection field of a given strength.

Although not shown in the drawings because it does not form a part of the invention, it may be advantageous to surround the entire vidicon focusing and deflection assemblies with a cylindrical magnetic shield for preventing stray magnetic fields from interfering with the desired deflection and focusing fields.

What is claimed is:

1. An electromagnetic focusing and deflection system for a cathode ray tube, comprising:

a first pair of saddle-type deflection coils disposed for providing vertical deflection of an electron beam of said cathode ray tube;

a second pair of saddle-type deflection coils disposed coaxially with said first pair and disposed for providing horizontal deflection of said electron beam of said cathode ray tube;

each of said coils comprising convolutions of wire wound to form two groups of active conductor extending generally longitudinally of the central longitudinal axis of said cathode ray tube joined by two groups of conductors forming end turns extending generally transversely of said tube axis and joining said longitudinally extendng conductor groups at the front and rear portions thereof, said two groups of longitudinal conductors being flared outwardly such that they are disposed farther from said tube axis at their front portions than at their rear portions; and a focusing coil assembly for providing a nonuniform magnetic focusing field disposed coaxially with said vertical and horizontal deflection coils.

2. An electromagnetic focusing and deflection system for a cathode ray tube according to claim 1 wherein said focusing coil assembly is disposed coaxally inside said vertical and horizontal deflection coils.

3. An electromagnetic focusing and deflection system for a cathode ray tube according to claim 2 wherein said focusing coil assembly is selected such that said nonuniform magnetic focusing field is greater at the rear of said assembly than at the front thereof.

4. An electromagnetic focusing and deflection assembly for an image conversion tube, comprising:

a focusing coil assembly for producing a nonuniform axial magnetic focusing field extending generally along the central longitudinal axis of an image conversion tube, said assembly being selected for producing said field having a decreasing magnetic field in the target region of said tube relative to the magnetic field existing in the electron gun region of said tube; and a pair of vertical and a pair of horizontal saddle-type deflection coils disposed coaxially with said focusing coil assembly, the conductors of said coils being flared outwardly from said central longitudinal axis at the target end portion of said coils for producing transverse magnetic deflection fields, said magnetic focusing and deflection coils producing a total magnetic field which reduces beam astigmatism and beam landing error over the scanned portion of said target.

5. An electromagnetic focusing and deflection assembly according to claim 4 wheren said focusing coil assembly is disposed inside of said deflection coils.

6. An electromagnetic focusing and deflection assembly according to claim 5 wherein said focusing coil assembly comprises a plurality of segments, each adapted to be energized for producing said nonuniform focusing field.

7. An electromagnetic focusing and deflection assembly according to claim 5 wherein said focusing coil assembly comprises a nonuniformly wound coil for producing said nonuniform focusing field.

8. An electromagnetic focusing and deflection assembly according to claim 6 wherein the non-flared portion of said deflection coils are adapted to be adjacent said image conversion tube and said segmented portions of said focusing coil are adapted to be adjacent said tube within said flared portion of said deflection coils and at the rear of said deflection coils.

9. An electromagnetic focusing and deflection assembly according to claim 6 wherein one of said segmented portions of said focusing coil assembly at the rear of said deflection coil assembly is substantially narrower in a longitudinal direction and thicker in a radial direction than the other of said segmented portions for providing the desired magnetic field without excessive heating of said tube.

10. An electromagnetic focusing and deflection assembly for a cathode ray tube, comprising:

a deflection yoke assembly adapted to be disposed coaxially about a cathode ray tube and having coil portions adapted to be energized for providing horizontal and vertical deflection of an electron beam of said cathode ray tube, said yoke having the active deflection field producing conductors flared outwardly at the end of said yoke assembly to be disposed closest to the target electrode portion of said tube; and a focusing coil assembly disposed coaxially with said deflection yoke assembly for producing a nonuniform axial magnetic focusing field having a greater strength at the electron gun portion of said cathode ray tube relative to the strength of said focusing field at the target electrode portion of said tube.

11. An electromagnetic focusing and deflection assembly according to claim 10 wherein said deflection yoke assembly is a toroidally wound yoke having coil portions for producing vertical and horizontal magnetic deflection fields.

References Cited

UNITED STATES PATENTS

| | | | |
|---|---|---|---|
| 2,159,534 | 5/1939 | Ruska | 313—84 |

FOREIGN PATENTS

| | | | |
|---|---|---|---|
| 1,190,411 | 5/1970 | Great Britain | 313—79 |

GEORGE HARRIS, Primary Examiner

U.S. Cl. X.R.

313—84